May 29, 1962  C. F. STRANDBERG  3,036,766
PRODUCTION INTEGRATION METHOD AND APPARATUS
Filed Jan. 14, 1958  3 Sheets-Sheet 1

INVENTOR
Charles F. Strandberg
BY
ATTORNEY

United States Patent Office 3,036,766
Patented May 29, 1962

3,036,766
PRODUCTION INTEGRATION METHOD
AND APPARATUS
Charles F. Strandberg, Greensboro, N.C., assignor to Strandberg Engineering Laboratories, Inc., Greensboro, N.C.
Filed Jan. 14, 1958, Ser. No. 708,794
11 Claims. (Cl. 235—92)

This invention comprises a method and an apparatus for converting information proportional to units of production from a plurality of random sources or machines to an analog function of the number of random sources or machines contributing to production. The method and apparatus permit the analog resultant to be represented either as total efficiency against time or as the number of machines or sources operating against time. The method and apparatus also permit registration of the total production in machine hours translated from units of production.

In textile weave rooms, looms are assigned to workers in groups. The total production from a group of looms can be registered in one counter located at a remote place by employment of the apparatus disclosed in my application Serial No. 572,902, filed March 21, 1956, entitled Random Information Counting Method and Apparatus, now Patent No. 2,831,635, dated April 22, 1958.

The equipment covered by my prior application does not provide for determination of the number of machines operating at any time, nor does it allow for determination of total machine-hours of production. It simply converts digital data arriving at random times from a plurality of machines to digital data which is sequential with respect to time and allows this result to be counted.

It is an object of this invention to provide apparatus which will chronologically record the number of machines operating, thus providing a continuous record of the number of machines operating and idle at any time, or the running percent efficiency at any time.

It is another object of this invention to provide apparatus which will indicate the number of machines which are contributing to the total production at any time.

It is also an object of this invention to provide apparatus which will indicate the total production of a group of machines in terms of machine hours.

It is another object of this invention to provide apparatus which will count the total hours in a period of testing.

In order to accomplish these objectives, the random to sequential digital counter disclosed in application Serial No. 572,902 may be used with the modification that the sampling rate is made less than the production rate of any one machine rather than greater than the production rate of any one machine as is required when the equipment is used to count.

If the sampling rate is made less than the production rate of any one machine, the apparatus will count each time of sampling, provided the machine is operating. Should the machine stop operating, its last impulse to charge its corresponding memory capacitor will be counted at which time the capacitor will be discharged and no further counts will be registered.

In order that some convenient fractional measure of machine time hours can be registered to fulfill one of the objectives of this invention, it is desirable that the sampling period be a decimal fraction of one hour, such as one hundredth of an hour, requiring a sampling speed of 100 revolutions per hour. In the apparatus disclosed, the speed is 30 revolutions per hour, but equipment is included for dividing the registration by three, thus delivering counts in tenths of machine hours.

Other advantages and features of the invention will become apparent from the following description taken in conjunction with the accompanying drawings, wherein like characters of reference are used to designate like parts, and wherein.

Figure 1:
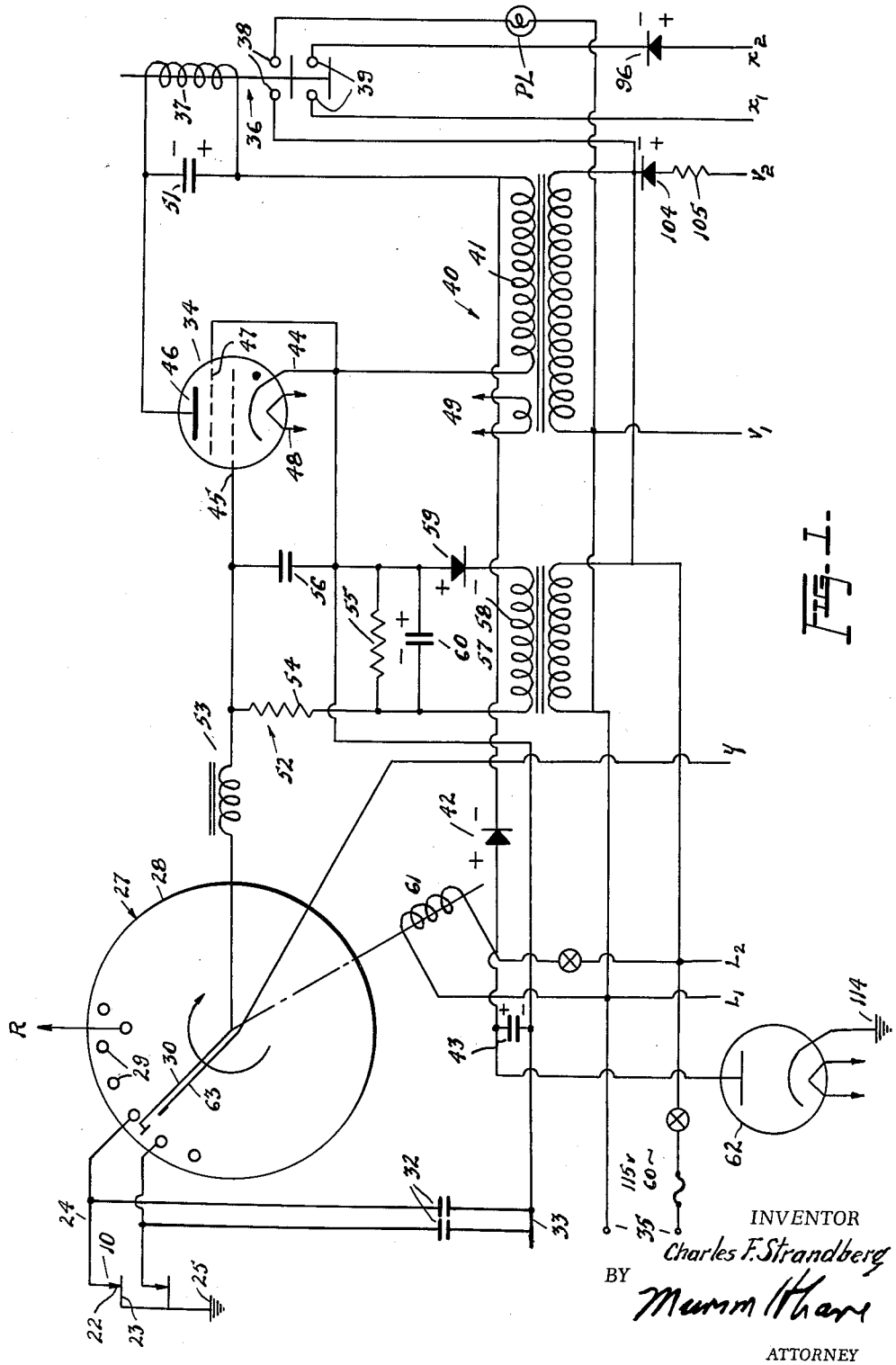
FIGURE 1 is a diagrammatic illustration of the circuit and apparatus comprising the random to sequential data converter which is a part of my production integration apparatus.

The random to sequential data converter illustrated in FIGURE 1 accepts data produced at random by a plurality of information sources, such as production machines, and converts it into sequentially arranged digital data. Each information source is provided with an electric impulse switch designated generally by the reference numeral 10. One contact 23 of each impulse switch is connected to a common ground 25. A second contact 22 is connected by conductor 24 to a rotary sampling switch 27. The latter comprises a plate 28 having a plurality of circumferentially spaced contacts or segments 29 thereon, the number of these contacts or segments corresponding to the number of information sources to be counted. The plate 28 also carries a rotor arm 30 which is suitably driven at a fixed rate so as to successively engage the contacts 29 each once during a certain period.

The wires or conductors 24 from the several switches 10 are connected to the respective contacts 29 of the sampling switch 27, it being noted that for simplicity of illustration in the accompanying FIGURE 1, only several of such connections have been shown.

The sampling switch 27 is adapted to retain an electrical impulse on any one of the contacts 29 until such impulse is picked up by the rotor arm 30 and transmitted by means hereinafter described to a relay 36. A plurality of memory capacitors 32 are provided in circuit with the respective conductors 24 leading to the respective segments 29 and a common negative direct current bus 33. The direct current source may comprise any conventional power supply but has been shown by way of illustration to consist of a rectifier network 40 comprising a transformer 41, a rectifier element 42 and a filtering capacitor 43. The polarity of the current supply is such that the capacitors 32 are charged when the respective switches 10 are momentarily closed thereby making the segments 29 positive with respect to the cathode 44 of a suitable impulse receiving tube 34.

The impulse receiving tube 34 may be a gas filled tetrode as illustrated, comprising in addition to the cathode 44 a control grid 45, a plate 46, a screen grid 47, and a filament 48. The filament is supplied with alternating current by transformer 49. The plate circuit includes the transformer 41 and the coil 37 of relay switch 36 and is adapted to close relay 36 whenever tube 34 conducts. The relay 36 includes multiple contact sets 38 and 39 each in separate circuits which will be subsequently described. Capacitor 51 is placed in parallel with coil 37 to provide suitable relay response.

Control grid 45 is connected by a suitable impulse integrating network 52 with the sampling rotor 30. The impulse integrating network is illustrated to include inductance 53 connected in series with the sampling rotor and control grid, and series resistors 54 and 55 in parallel circuit with capacitor 56 connected between the control grid 45 and cathode 44.

Control grid bias is provided by rectifier network 57 including transformer 58, rectifier element 59, capacitor 60 and output resistor 55.

The rotor arm 30 is rotated at a constant speed by a suitable drive motor 61. The speed at which the rotor is driven is selected to be less than the rate of occurence of the impulses applied to any given segment.

When the rotor arm 30 picks up an impulse from any one of the segments 29, the grid 45 of the tube 34 is rendered positive, causing the tube to conduct and close relay 36. The closing of the latter is arranged to transmit sequentially arranged digital data to the circuits including the relay contacts 38 and 39.

A pilot light PL is provided in circuit with contacts 38 and a source of alternating current 35 to produce a flashing signal indicating the transmission of digital data through relay 36.

To prevent interaction between multiple counting circuits connected to any one impulse switch 10, a diode 62 is provided in the discharge path of memory capacitors 32 to ground.

Figure 2:
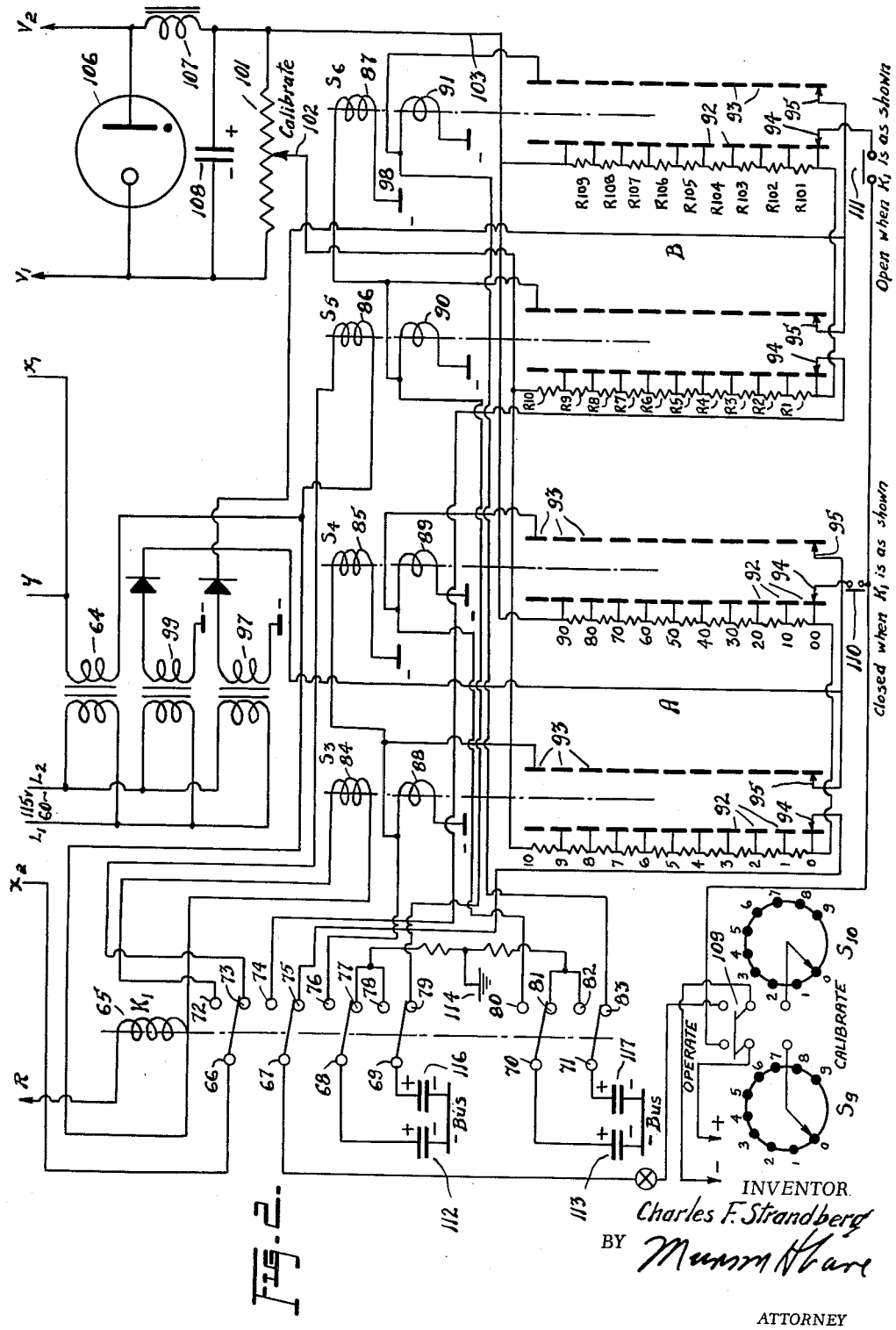
FIGURE 2 is a diagrammatic illustration of the circuit and apparatus comprising the digital to analog data converter which is used in conjunction with the circuit of FIGURE 1. Connections between the circuit of FIGURE 1 and the circuit of FIGURE 2 are represented by like symbols.

The circuits and apparatus used in conjunction with the circuits and apparatus of FIGURE 1 to convert digital data to analog data are illustrated in FIGURE 2.

The sequential data output derived from the random information counter is converted from its digital form to analog form by means which are made special by the nature of the sequential counts. In this instance, in order for the analog function to be in exact relationship with the digital counts being received, all random sources must be sampled and counted before a recording pen can be positioned to the proper line on a record chart. This is accomplished by means of two sets of decimal readout counters designated A and B, one of which is made to record its accumulated count of one revolution of the sampling switch while the other is counting the total from the next. The recorder, which plots the resulting analog function, is then fed by two circuits alternately as completed revolutions are made by the sampling switch.

The circuit in FIGURE 1 comprises the random to sequential data converter, described in application Serial No. 572,902, now Patent No. 2,831,635, with the modification in sampling switch speed for a sampling rate less than the production rate of any one machine. The sampling switch also accommodates the provision for exchanging readout circuits once per revolution by means of the segment marked R and the additional rotor arm 63 shown connected to one side of a 12-volt A.-C. source of power 64. The other side of the 12-volt source is connected to R through the coil 65 of the impulse ratchet relay K1. Impulses supplied to the coil 65 of this relay cause it to alternate its contacts between two positions.

The ratchet relay employs six pole blades numbered consecutively 66 to 71, each double throw and alternating between engagement with even numbered contacts 72–82 and with odd numbered contacts 73–83. In the position shown, the uppermost pole 66 is transferring count impulses to the two stepping switches, S5 and S6 which are connected identically as switches, S3 and S4.

The stepping switches S3, S4, S5 and S6 are actuated by stepping coils 84, 85, 86 and 87, respectively, and are reset to zero position by reset coils 88, 89, 90 and 91, respectively. Each switch comprises two sets of multiple contacts 92 and 93 and separate blades 94 and 95 engageable respectively therewith. The contacts 92 are connected individually and successively to taps in a series resistor network from which the readout voltage is taken. These taps are indicated by numerals representing the count associated with each contact.

The circuit transferring count impulses to the stepping switch S5 includes the contacts 39 of relay 36, alternating current supply 64, stepping coil 86 of the stepping switch S5, contact 73 and pole 66 of relay K1 and rectifier 96. The circuit transferring count to the stepping switch S3 during its counting cycle is similar except that it includes stepping coil 84 and contact 72 of relay K1. Every time the stepping switch S5 receives a count impulse it advances one step. On the tenth count S5 advances one step to complete a circuit transferring the count from S5 to the switch S6. Therefore the switch S5 and the corresponding switch S3 function as units counters and the switches S6 and S4 function as tens counters.

The transfer circuit from S5 to S6 is completed by blade 95 of S5 when it engages the contact 93 in the tenth count position. Current then flows from them D.-C. voltage source 97 through the blade 95 and the contact 93 of S5, through the stepping coil 87 to the negative bus. A similar but independent circuit transfers count from S3 to S4. This circuit includes the D.-C. voltage source 99, blade 95 and contact 93 of S3, the coil 85 of S4 and the negative bus.

Switch S5 is reset simultaneously with the transfer of count to S6 since the reset coil 90 is connected in parallel with the stepping coil 87 between the negative bus and the contact engaged by blade 95.

The pole 67 of relay K1 is shown transferring readout data from switches S3 and S4 to the recorder input. The data is developed as a D.-C. voltage proportional to the number of counts made during a previous counting cycle. The series of precision resistors, R1–R10 each of substantially equal resistance and R101–R109 also of equal resistance but of ten times the resistance value of the resistors R1–R10, is supplied with regulated D.-C. voltage from the calibrate potentiometer 101. R10 at one end of the series of resistors is connected to the calibrate potentiometer by an adjustable tap 102; R109 at the other end is connected by conductor 103 to the positive side of the potentiometer.

The voltage supply for the potentiometer 101 may be any well regulated D.-C. supply. It is shown to include alternating current supply 35, rectifier 104, resistor 105, voltage regulator 106 and L-C filter network including inductance 107 and capacitor 108.

Voltage corresponding to the number of counts received by the readout circuit A is taken from across a portion of the series resistor network by means of the blades 94, 94 engaging the contacts 93, 93 of switches S3 and S4. In the position for switches S3 and S4 shown, a zero count is being transferred to the recorder input because none of the resistor network is included in the readout circuit between the blades 94, 94.

The output circuit for readout circuit A includes (in addition to the blades 94, 94 and any resistors included between the contacts 93, 93 engaged by the blades) a double pole, double throw operate-calibrate switch 109, isolation switch 110 (closed when K1 is as shown) and the contacts 75 and pole 67 of relay K1.

The output circuit for readout circuit B is similar to that of readout circuit A except that it includes isolation switch 111 (open when K1 is as shown) and contacts 74 of K1. The isolation switches 110 and 111 are provided to separate the output circuits of readout circuits A and B and to allow them alternately to supply data to the recorder input.

In the position shown for the ratchet relay K1 the lower four poles have accomplished the reset requirements of the two sets of stepping switches S3, S4, S5 and S6. In this position the poles 68 and 70 are serving to charge capacitors 112 and 113, from the D.C. voltage source which exists from ground 114 to the negative bus. The poles 69 and 71 have permitted capacitors 116 and 117 to discharge through the reset coils 90 and 91 of both stepping switches, S5 and S6, respectively, which at the instant of transfer of the ratchet relay were reset from their previously accumulated count positions and permitted to begin the counting process again.

After one complete revolution of the sampling switch has been made, stepping switches S5 and S6 will have stepped to positions corresponding to the total count received or number of machines operating, while during this period stepping switches S3 and S4 will have been idle and will have supplied to the recorder an analog voltage representation of the number of counts accumulated during the previous revolution of the sampling switch.

At the instant of completion of the full revolution of the sampling switch, segment R will be engaged by the additional rotor arm, ratchet relay K3 will reverse its position, and the process will repeat, resetting stepping switches S3 and S4, restoring them to receive counts, and feeding out of the apparatus a voltage proportional to the accumulated count of stepping switches S5 and S6.

The analog data obtained can be presented either as a function of efficiency or as a function of the number of machines operating. This is accomplished by setting selector switches S9 (tens) and S10 (units) to the total number of random sources of production information being applied. The units selector switch S10 includes a series of contacts designated by the numerals 0 to 9 connected to the corresponding contacts 92 of the units stepping switch S3. The tens selector switch S9 includes a series of contacts connected to corresponding contacts on the tens stepping switch S4. The selector switches may be connected to either pair of stepping switches S3, S4 or S5, S6. By means of the operate-calibrate switch 109, the particular amount of voltage which will be delivered as the analog function when all machines are operating will be fed to the recorder. The calibrate potentionmeter is then adjusted so that the recorder indicates the desired function, such as 100 units for percent efficiency and the number of machines for recording the number of machines operating.

The operate-calibrate switch, when returned to the operate position, will permit the recorder to plot the desired function.

Figure 3:
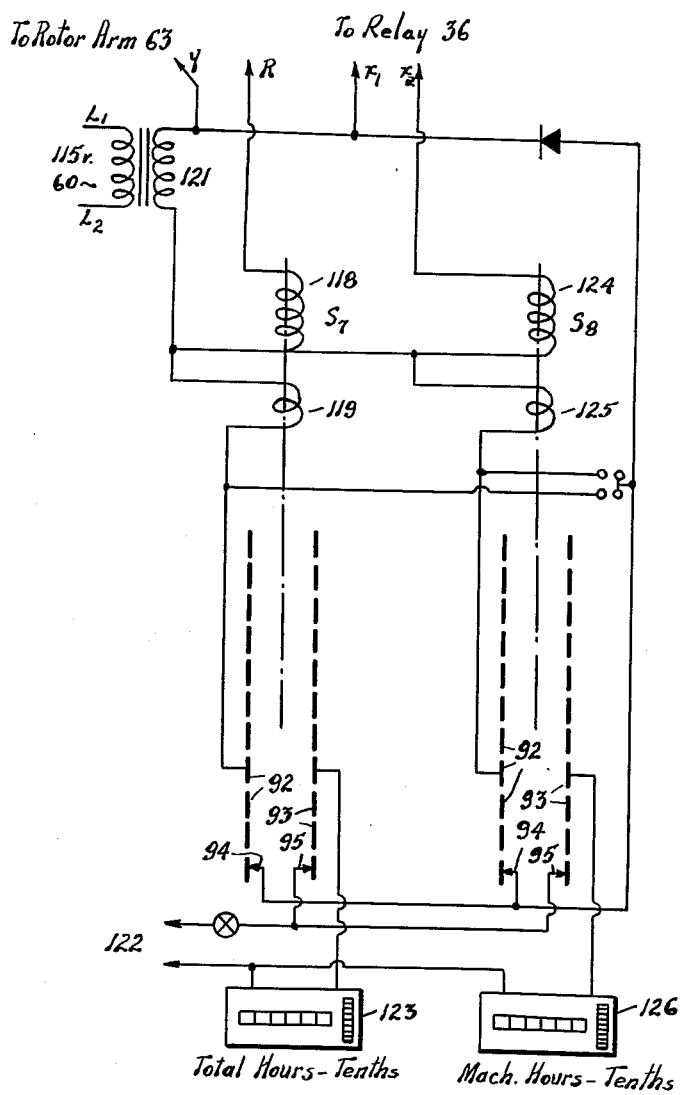
FIGURE 3 is a diagrammatic illustration of the total hours counting circuits and the machine hours counting circuits used in cooperation with the circuit of FIGURE 1. Connections between the circuit of FIGURE 1 and the circuit of FIGURE 3 are represented by like symbols.

Apparatus for counting the total hours during a testing period is shown in FIGURE 3. It includes stepping switch S7 which counts the number of times the sampling switch arm 63 engages the segment R and divides this total by three. For a sampling rate of 30 revolutions per hour the apparatus provides a convenient means for registering the duration of the test in tenths of hours.

Stepping switch S7 is identical with stepping switches S3, S4, S5, S6 and S8. It includes a stepping coil 118 and a reset coil 119 which actuate the blades 94, 95 relative to the two contact sets 92 and 93. Stepping coil 118 is in circuit with the segment R on the sampling switch 27, and an alternating current source 121. Every time the rotor arm 63 engages the segment R, the stepping coil is energized and actuates the blades 94, 95 one step. When the stepping switch has completed three steps, the blade 95 completes a circuit through an alternating current source 122 and the counter 123 which records a count equivalent to one-tenth hour.

Simultaneously the switch blade 94 engages contact set 92 equivalent to the number 3 count and completes a circuit including the reset coil 119 so that the stepping switch S7 is reset to zero. The stepping switch advances and resets every three revolutions of the sampling switch so that the interval between impulses applied to the stepping coil S7 is divided by three.

Stepping switch S8 counts the total number of impulses received continuously from relay 36 which for the particular sampling switch speed employed is equal to total production in units of one-thirtieth machine-hour each. Stepping switch S8 is shown set to divide these counts by three, thus providing registration in tenths of machine-hours of production.

Stepping switch S8 functions similarly to stepping switch S7. It includes stepping coil 124 and reset coil 125 which actuate the blades 94 and 95 relative to the two contact sets 92 and 93. Coil 124 is in circuit with the contacts 39 of relay 36 and is energized every time relay 36 is closed. Counter 126 is in the output circuit of switch S8 and is actuated every third step of S8.

While in the foregoing there have been described and shown the preferred embodiments of the invention, various modifications my become apparent to those skilled in the art to which the invention relates. Accordingly, it is not desired to limit the invention to this disclosure and various modifications may be resorted to, such as may lie within the spirit and scope of the appended claims.

The present application is a continuation-in-part of my application Serial No. 572,902, filed March 21, 1956, now Patent No. 2,831,635.

What is claimed is:

1. A method for converting digital information proportional to the units of production from each of a plurality of machines to an analog function of the number of machines contributing to production, wherein said digital information is in the form of electric impulses generated in response to a contribution by each machine of a selected multiple of its units of production, which consists in separately storing the impulses produced for each machine, sequentially sampling said stored impulses at a rate less than the rate at which said electric impulses are produced whereby sequentially arranged impulses are obtained which represent machines contributing to production during a sampling period; generating a constant voltage; counting said sequentially arranged impulses during one sampling period with one of two decimal readout counters, and simultaneously converting the total count to a voltage representation by tapping off a successive portion of said constant voltage for each count received, so that the ratio of the voltage representation of the total count to the constant voltage is proportional to the ratio of the number of machines contributing to production to the total number of said plurality of machines; reading out during the same period the voltage representation of the total count accumulated by the other decimal readout counter during the preceding period, and alternating the functions of said readout counters during each next succeeding period.

2. A method for continuously reading out an analog resultant representing total running efficiency of a plurality of production machines, which consists in generating a constant voltage representing one hundred percent efficiency corresponding to all of the machines operating, periodically producing an electric impulse for each machine which is operating, arranging the impulses in sequential order, during one period simultaneously counting said impulses with one of two decimal readout counters and converting the total count to a voltage representation thereof which is proportional to said constant voltage in the ratio of the total number of machines operating to the total number of said plurality of machines, reading out during the same period the voltage representation of the total count accumulated by the other of said counters during the preceding period, and alternating the functions of said decimal readout counters during each next succeeding period.

3. A method for continuously reading out an analog resultant representing total number of operating machines from a plurality of production machines, which consists in generating a constant voltage representing the total number of said plurality of machines, periodically producing an electric impulse for each machine which is operating, arranging the impulses in sequential order, during one period simultaneously counting said impulses with one of two decimal readout counters and converting the total count to a voltage representation thereof which is proportional to said constant voltage in the ratio of the total number of machines operating to the total number of said plurality of machines, reading out during the same period the voltage representation of the total count accumulated by the other of said counters during the preceding period, and alternating the functions of said decimal readout counters during each next succeeding period.

4. In a system for converting digital information into an analog function and continuously reading out the analog function of the digital information accumulated during successive periods, including: a constant voltage source, a pair of series resistor networks connected in parallel across said constant voltage source, two similar decimal counters operating in re-occurring cycles which include a digital information counting period and an analog function readout period, each counter having associated therewith one of said series resistor networks and including a movable contact, means to tap off successive increments of votlage from said series resistor network for each count received, a digital information input circuit, an analog function output circuit, alternating means for independently connecting one counter to said digital information input circuit while simultaneously connecting the other counter to said analog function output circuit during one operating period, and then alternating the connections for each succeeding operating period, and separate means for resetting each counter at the end of its readout period.

5. The system as in claim 4 wherein each counter comprises at least one stepping switch having a zero position and a maximum position and including said movable contact means, a movable reset contact insulated from and movable with said movable contact, a stepping coil, a reset coil, a series of fixed contacts connected at equally spaced intervals along said associated series resistor network and a maximum position contact connected in series with said reset coil, said movable contact means being operated by said stepping coil to engage successive fixed contacts from a zero position to next to maximum position, said movable reset contact being operated to engage said maximum position contact at the maximum position of said stepping switch, said reset coil being actuated by said reset means to return the movable contact means to zero position at the end of each readout period, circuit means including said reset coil, said maximum position contact and said movable reset contact, completed by the stepping switch at the maximum position to return the movable contact to zero position after said maximum position is reached, and output circuit means including said movable contact and the fixed contact engaged thereby for connecting the portion of the series resistor network tapped off by said movable contact to said analog function output circuit.

6. The system as in claim 4 wherein said separate means for resetting each counter at the end of its readout period includes a capacitor in circuit with a power supply which is alternately connected to its associated counter and sequentially to ground by said alternating means.

7. The system as in claim 4 wherein said alternating means includes a periodic switch in circuit with a source of electric power, and a multipole, double-throw relay switch, said relay being operable to alternate the position of its poles on completion of each cycle of the periodic switch.

8. The system of claim 4 wherein said pair of series resistor networks each comprise a plurality of precision resistors adjustably connected across said constant voltage source by means of a calibrate potentiometer.

9. A system for converting digital information proportional to units of production from each of a plurality of machines to an analog function of the number of machines wherein said digital information is in the form of electric impulses generated in response to a contribution by each machine of a selected multiple of its units of production, comprising in combination with the system of claim 4, means for separately storing the impulse produced for each machine, means for sequentially sampling said stored impulses at a rate less than the rate at which said electric impulses are produced, whereby sequentially arranged impulses are obtained which represent machines contributing to production during a sampling period, and means feeding said sequentially arranged impulses to said digital information input circuit, said sampling switch including means to operate said alternating means at the beginning of each sampling period.

10. In a system for converting digital data to an analog function and continuously reading out the analog function of the digital data accumulated during successive periods, comprising a digital data input circuit, an analog function output circuit, a constant voltage source, two similar decimal readout counters, alternating means for independently connecting one counter to said digital data input circuit while simultaneously connecting the other counter to said analog function output circuit during one operating period and then alternating the connections for each succeeding operating period; each counter having an associated series of resistors connected in series across said constant voltage source, said series comprising at least a units group and a tens group of resistors connected in succession, said units group comprising plural resistors of equal value, and said tens group comprising plural resistors of equal value but each ten times the value of the resistors in the units group, said decimal readout counter comprising at least a units stepping switch and a tens stepping switch corresponding in number to said groups of resistors, each stepping switch having a zero position and a maximum position, a stepping coil and a reset coil, a set of plural fixed contacts a maximum position contact, and a movable contact engageable successively with each one of said plural contacts of said set. a movable reset contact insulated from and movable with said movable contact, means connecting the contacts in said set of contacts of said units switch individually to successive resistors in said units group whereby successive contacts correspond to a voltage value representing units from zero to nine, means connecting the contacts in said set of contacts of said tens switch individually to successive resistors in said tens group, whereby successive contacts correspond to voltage values representing tens from ten to ninety; a digital data receiving circuit including the stepping coil of said units stepping switch operative for advancing said units stepping switch one step for each digital data unit received up to the count of ten; transfer means for transferring count from the units stepping switch to the tens stepping switch, and means for resetting the units switch simultaneously on receipt of the tenth units count including the reset coil of said units stepping switch in a reset circuit with a power supply, said maximum position contact and said movable reset contact, said movable reset contact effecting completion of said reset circuit upon engagement with said maximum position contact, said transferring means including the stepping coil of said tens stepping switch operative for advancing said tens switch one step every ten counts; and additional circuit means including the reset coil, the maximum position contact, and the movable reset contact of said tens stepping switch for resetting the tens stepping switches on receipt of the one-hundred count, and output circuit means which includes the units and tens resistors between contacts engaged by said movable contact of said units switch and said tens switch respectively.

11. In a system for converting digital data to an analog function thereof, which includes a substantially constant voltage power supply, a series of resistors adjustably connected in series across said constant voltage power supply, comprising at least, a units group and a tens group of resistors connected in succession, said units group comprising plural resistors of equal value, and said tens group comprising plural resistors of equal value but each ten times the value of the resistors in the units group, at least a units stepping switch and a tens stepping switch corresponding in number to said groups of resistors, each stepping switch having a zero position and a maximum position, a stepping coil, and a reset coil, a set of plural fixed contacts, a maximum position contact, and a movable contact engageable successively with each one of said plural contacts of said set, a movable reset contact insulated from and movable with said movable contact, means connecting the contacts in said set of contacts of said units switch individually to successive resistors in said units group whereby successive contacts correspond to a voltage value representing units from zero to nine, means connecting the contacts in said set of contacts of said tens switch individually to successive resistors in said tens group, whereby successive contacts correspond to voltage values representing tens from ten to ninety; a digital data receiving circuit including the stepping coil of said units stepping switch operative for advancing said units stepping switch one step for each digital data unit received up to the count of ten; transfer means for transferring count from the units stepping switch to the tens stepping switch, and means for resetting the units switch simultaneously on receipt of the tenth units count including the reset coil of said units stepping switch in a reset circuit with a power supply, said maximum position contact and said movable reset contact, said movable reset contact effecting completion of said reset circuit upon engagement with said maximum position contact, said transferring means including means for advancing said tens switch one step every ten counts; an analog data output circuit which includes the units and tens resistors between contacts engaged by said first contact wipers of said units switch and said tens switch respectively; and additional circuit means including the reset coil, the maximum position contact, and the movable reset contact of said tens stepping switch for resetting the tens stepping switches on receipt of the one-hundred count.

References Cited in the file of this patent

UNITED STATES PATENTS

| | | |
|---|---|---|
| 1,845,534 | Waite | Feb. 19, 1932 |
| 1,956,413 | Clayton | Apr. 24, 1934 |
| 2,207,715 | Bumstead | July 6, 1940 |
| 2,537,427 | Seid et al. | Jan. 9, 1951 |
| 2,539,623 | Heising | Jan. 30, 1951 |
| 2,591,007 | Rench | Apr. 1, 1952 |
| 2,656,524 | Gridley et al. | Oct. 20, 1953 |
| 2,736,006 | Langevin et al. | Feb. 21, 1956 |
| 2,752,585 | Jacobson et al. | June 26, 1956 |
| 2,768,348 | Grumet et al. | Oct. 23, 1956 |
| 2,793,806 | Lindesmith | May 28, 1957 |
| 2,812,493 | Bryan | Nov. 5, 1957 |
| 2,828,468 | Ball et al. | Mar. 25, 1958 |
| 2,881,418 | Stephens et al. | Apr. 7, 1959 |
| 2,915,688 | Wilde | Dec. 1, 1959 |